Nov. 17, 1964 N. J. MORRIS 3,157,716
AUTOMATIC CONTROL FOR EVAPORATIVE COOLER
Filed Aug. 3, 1962 2 Sheets-Sheet 1

Noel J. Morris
INVENTOR.

BY *Clarence A. O'Brien*
*and Harvey B. Jacobson*
Attorneys

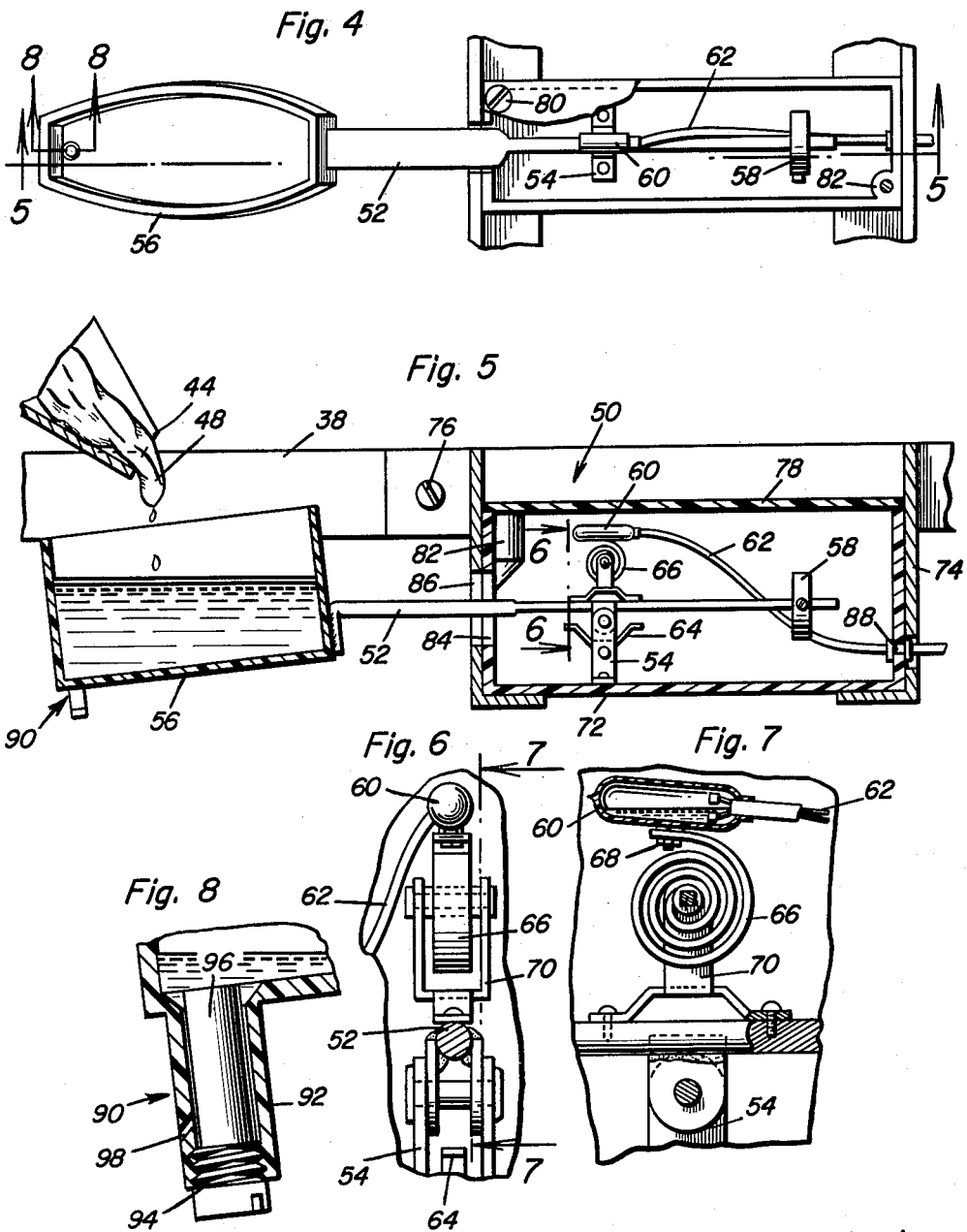

3,157,716
AUTOMATIC CONTROL FOR EVAPORATIVE COOLER
Noel J. Morris, 333 W. Bilby Road, Tucson, Ariz.
Filed Aug. 3, 1962, Ser. No. 214,585
6 Claims. (Cl. 261—27)

The present invention generally relates to evaporative coolers, and more particularly to a novel means for automatically controlling evaporative coolers.

One of the major drawbacks to the use of evaporative cooler systems prior to the present invention has resulted from the inability to effectively and automatically control the high humidity resulting from the use of such systems. Because of the great amount of dampness usually accompanying the evaporative cooler systems, many persons adversely affected by such dampness, such as those suffering from arthritis, asthma, sinus and other similar conditions, have found it necessary, if any relief was to be obtained from the high summer temperatures normally encountered in various parts of this country, to go to the much greater expense of installing and operating various air conditioning systems.

Accordingly, one of the primary objects of the present invention resides in the provision of an automatic control for evaporative coolers wherein a maximum amount of cooling is obtained with the introduction of only a minimum amount of increase in the humidity.

Another object of the present invention resides in a control system for evaporative coolers which will automatically limit the amount of water introduced into the cooler pads.

Another object of the present invention is to provide a highly effective though relatively simple automatic control mechanism capable of being adapted to various conventional evaporative coolers.

Also, an object of the present invention is to provide controls for an evaporative cooler wherein the blower is automatically controlled as well as the water pump introducing water into the cooler pads.

A further object of the present invention resides in the provision of a trouble free control device requiring little or no maintenance over extended periods of time.

In order to achieve the above objects, it is contemplated that the control device consist basically of an elongated arm pivotally supported at an intermediate portion thereof and provided with a tank at the first end thereof into which water draining through the cooler pads is slowly directed, the other end of this arm having a counterweight thereon and a mercury switch means being provided along the arm. This switch, controlling the pump motor, is specifically orientated so as to be in an off position upon a lowering of the tank and of the arm which would result from a flowing of a predetermined amount of water into the tank. Thus, it will be appreciated that the amount of water flowing into the cooler pads is to be directly controlled by the degree of saturation of the cooler pads. Further, so as to automatically accommodate periods of extremely high temperature, it is contemplated that a coil spring thermostat be used to mount the mercury switch on the pivotally mounted arm with the spring, upon a predetermined temperature being reached, varying the orientation of the mercury switch to the arm so as to enable the accommodation of a greater amount of water in the cooler pads resulting from a longer running of the water pump.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged top plan view of the control device of the cooler taken substantially on a plane passing along line 4—4 in FIGURE 2;

FIGURE 5 is a cross-sectional view taken substantially on a plane passing along line 5—5 in FIGURE 4;

FIGURE 6 is an enlarged view taken substantially on a plane passing along line 6—6 in FIGURE 5;

FIGURE 7 is a view taken substantially on a plane passing along line 7—7 in FIGURE 6;

FIGURE 8 is an enlarged cross-sectional view taken substantially on a plane passing along line 8—8 in FIGURE 4.

Figure 1:
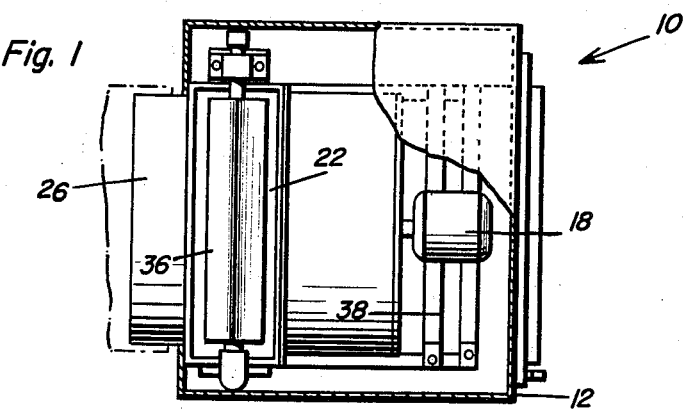
FIGURE 1 illustrates a top plan view of the evaporative cooler of the present invention with portions broken away for purposes of clarity.

Referring now more specifically to the drawings, reference numeral 10 generally designates the evaporative cooler comprising the present invention. This cooler 10, generally enclosed by a suitable housing 12 having a plurality of air ports 14 therein, includes a conventional blower 16 driven by a motor means 18 and orientated so as to draw air through a filter 20 and expel this air through a plurality of cooler pads 22 mounted within a frame 24 between the blower 16 and an exhaust port 26. In order to supply water to the cooler pads 22, a pump 28, driven by a motor 30 is provided, with the water being pumped from a conventional main 32 through a series of pipes 34 to the top of the cooler pads 22 where a hood means 36 is provided for directing the water downwardly into the cooler pads 22.

Figure 2:
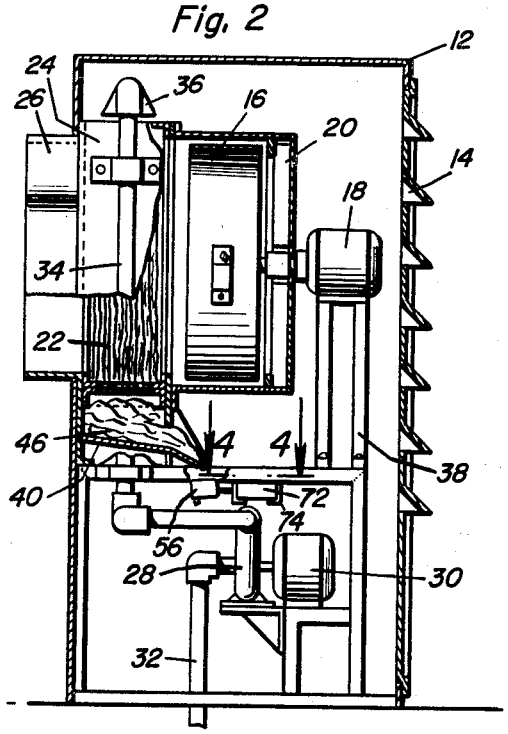
FIGURE 2 is a vertical cross-sectional view of the evaporative cooler of the present invention.
Figure 3:
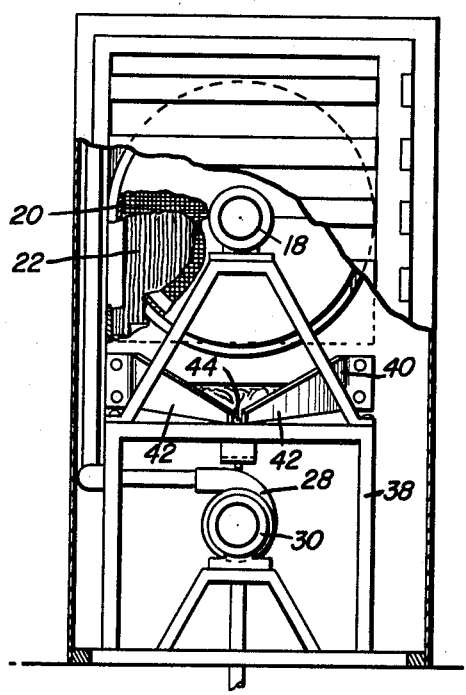
FIGURE 3 is a rear elevational view of the cooler with portions broken away for purposes of clarity.
Figure 9:
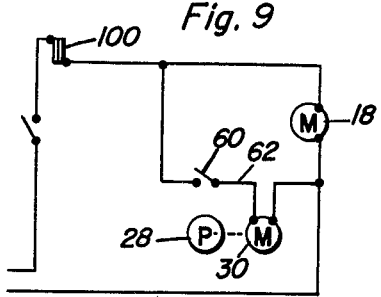
FIGURE 9 is a diagrammatic view of the wiring of the evaporative cooler comprising the present invention.

As will best be appreciated from FIGURES 2 and 3, a suitable supporting framework 38 is provided with the pump 28 and pump motor 30 generally being located below the blower 16 and cooler pads 22.

Located directly below the cooler pads 22 and in communication therewith is an open top receptacle 40 inclined rearwardly and downwardly with the sides 42 thereof converging so as to form a narrow opening 44 at the rear thereof. Located within the receptacle 40 so as to receive the water which generally drips through the cooler pads 22 is a cloth wick 46, a portion of which may actually be inserted into the cooler pads 22 and the opposite end 48 which is to extend slightly beyond the opening 44. Thus, it will be appreciated that the water flowing through the cooler pads 22 is received within the cloth wick 46 positioned within the receptacle 40 with this water being slowly discharged from the outer end 48 of the wick 46 through the reduced opening 44. It is this discharge or dripping of the water from the end 48 of the wick 46 which effects the automatic control of the water pump.

The control device 50, operative in response to the water dripping from the end 48 of the wick 46, consists of an elongated arm 52 pivotally mounted at an intermediate point thereof by a bracket means 54 and having an enlarged open top plastic receptacle 56 at a first end thereof and an adjustable counterweight 58 at the other end thereof. Mounted to the arm 52 directly over the pivot point is a conventional mercury switch 60 which is in circuit with the pump motor 30 through suitable conductor means 62. It will be appreciated from FIGURES 5 and 7, that upon the introduction of a sufficient amount of water into the plastic tank 56, the arm 52 will pivot counterclockwise causing a counterclockwise movement of the mercury switch 60 and a subsequent flowing of the mercury away from the contact points therein so as to cause a de-energization of the pump motor 30, suitable stop means 64 being provided on the supporting bracket means 54 so as to limit both the clockwise and counterclockwise movement of the arm 52, the limited movement being sufficient to effect both an opening and a closing of the switch 60.

Further, it is contemplated that a thermostatic coil spring 66 be provided between the switch 60 and the arm 52 with the switch 60 being secured to the outer end of the spring 66 in any suitable manner such as by bolt means 68 and with the inner end of the spring being suitably secured to the arm 52 by bracket means 70. This thermostatic spring 66 is to be preset so as to operate under conditions of usually high temperature, such as temperatures of a hundred degrees or over, so as to vary the orientation of the mercury switch 60 to the arm 52 requiring the introduction of a greater amount of water into the plastic tank 56 in order to effect the counterclockwise movement necessary to open the switch 60.

While the major portion of the control mechanism 50 has been illustrated as being contained within a housing 72 supported by brackets 74 secured to the supporting framework 38 by suitable fastening means 76, it will be appreciated that, if so desired, the bracket means 54 can be mounted directly on the water pump with the housing 72 eliminated, the only requirement being that the tank 56 be located so as to receive the water dripping from the wick 46. With further reference to the housing 72, it will be appreciated that a removable top 78 is provided and releasably maintained in position by threaded fasteners 80 extending through the top and into internally threaded enlarged portions 82 formed integrally with the housing wall at diametrically opposed corners thereof. It will also be appreciated that a vertically elongated slot 84 is provided through the front wall of the housing 72 with a similar slot 86 being formed through the adjacent bracket so as to allow for the clockwise and counterclockwise movement of the pivotally mounted arm 52, a suitably grommetted hole 88 also being provided so as to allow for the passage of the conductor 62.

As will be appreciated from the above discussion taken in conjunction with the drawings, water forced by the pump 28 is introduced into the upper portion of the cooling pads 22 and subsequently soaks therethrough and into contact with the subjacent cotton or other suitable material wick 46 from which it is slowly discharged in drips into the plastic tank 56 which upon reaching a predetermined level causes a counterclockwise movement of the pivotally mounted arm 52 so as to result in a counterclockwise movement of the mercury switch 60 secured thereto resulting in a de-energization of the pump motor and a stopping of the flow of water into the cooler pads. However, the present invention also contemplates the automatic energizing of the pump motor 30 with this being effected by the provision of a drain valve 90 in the plastic tank 56, this valve being provided so as to allow for the discharge of the water from the tank 56 at a rate substantially slower than the rate at which the water is introduced into the tank. This drain valve 90, as illustrated in detail in FIGURE 8, consists of a tubular member 92 having an internally threaded lower end within which is adjustably received the threaded head portion 94 of an elongated cylindrical member 96 having a diameter slightly less than the diameter of the inner surface of the tubular member 92 so as to enable the passage of water therebetween and its subsequent discharge through the drain hole 98 provided in the side of the tube 92. Further, in order to facilitate the flow of water between the cylindrical member 96 and the tubular member 92, one side of this cylindrical member 96 can be slightly flattened.

In addition to the controlled running of the water pump 28 by means of the control mechanism 50 described supra, it is also contemplated that a conventional cooling thermostat 100, preferably having a range of 66° to 95° F., be provided in circuit with both the blower motor 18 and the pump motor 30 so as to effect a control of the over-all temperature of the area being cooled by the evaporative cooler 10. As will be readily appreciated, upon the area temperature being lowered to a predetermined degree, the thermostat 100 will operate so as to shutoff both the blower motor 18 and the pump motor 30 with a subsequent rise in temperature resulting in a starting of these motors, a completely automatic cooling system thus being provided.

From the foregoing, it is considered to be readily apparent that a novel automatic control has been provided for evaporative coolers in a manner so as to ensure the obtaining of the maximum amount of efficiency from the unit while avoiding any great increase in the humidity such as normally accompanies the use of such evaporative coolers.

In operation, the water pump is activated so as to introduce water into the cooler pads, as the cooler pads fill with water and reach a point of saturation, the water is taken up by the wick provided in communication with the lower end of the cooler pad with the water flowing through the wick and into the plastic tank of the control mechanism. As the tank gradually fills with water it tends to over-balance the pivotally mounted arm which has an adjustable counterweight mounted on the other end thereof. Upon being pivoted to a predetermined degree under the influence of the water dripping into the tank, the mercury switch mounted on the arm and connected to the pump motor is opened and the pump motor shut-off thus preventing the introduction of any more water into the cooler pads. With the water pump in the off position, the water remaining in the cooler pads continues to drain through the wick and into the tank thus maintaining the pump switch in an off position until a major portion of the water has drained from the cooler pads, the wick being capable of retaining a substantial amount of water thus enabling the cooler pads to drain at a greater rate than the rate of drainage from the wick into the plastic tank. As the dripping from the wick into the tank slowly stops, the tank begins to empty by means of the adjustable valve provided in the bottom thereof, this valve draining at a substantially slower rate than the rate of drainage from the wick into the tank so as to allow the filling of the tank. When the tank has emptied a sufficient amount, the tank rises under the influence of the counterweight and the contacts within the mercury switch are closed so as to again energize the water pump motor. As will be appreciated, during this entire cycle, the blower remains on thereby providing for a continual cooling effect while limiting the amount of moisture introduced into the air, the humidity of the air directly affecting the length of time the water pump is energized due to the more rapid drying by evaporation when the air is dry and hot or the slower evaporation present under more humid conditions. Also as brought forth supra, it is contemplated that a conventional cooling thermostat be provided in circuit with both the blower and pump motors so as to effect a de-energization of the entire evaporative cooler upon a cooling of the air to a certain degree with a subsequent rise in temperature again activating both the blower and water pump. Finally, attention is again directed to the fact that a thermostatic coil spring is provided between the mercury switch and the pivotally mounted arm with the spring set so as to operate under conditions of extremely high temperature so as to vary the orientation of the mercury switch to the arm thus allowing for the introduction of a greater amount of water into the cooler pads before a subsequent shutting off of the pump motor.

Accordingly, it has been shown that a novel control system for evaporative coolers has been devised which can effect the automatic prevention of the extreme dampness usually found in evaporative cooler operations with the introduction of water into the cooler pads being automatically stopped and started while the blower is constantly maintained in operation until the area temperature is reduced sufficiently so as to effect a shutting off of the entire system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in an evaporative cooler having cooler pad means, water pump means for delivering water to the upper end of the cooler pad means, and blower means for directing a flow of air through the cooler pad means; a control means for said water pump means said control means including an elongated arm pivotally mounted at an intermediate point thereof, a tank secured to one end thereof, said tank having an opening in the top thereof, a counterweight mounted on the other end thereof, and a switch means mounted on said arm, said switch means being in circuit with the pump means so as to start the pump means upon a lowering of the counterweight end of the arm past a predetermined point and so as to stop the pump means upon a lowering of the tank end of the arm past a predetermined point, said tank being positioned so as to receive water being discharged from the lower end of said cooler pad means, said discharged water causing an overbalancing of the arm and a lowering of the tank end, thereby turning the water pump means off in response to a predetermined amount of water moving through the cooler pad means.

2. The device of claim 1 wherein said tank includes a drain valve in the bottom thereof said drain valve allowing the drainage of water from said tank at a rate substantially slower than the rate of drainage from said cooler pad means into said tank, thereby effecting a delayed turning on of the water pump means subsequent to a slowing or stopping of the discharge of water from the cooler pad means resulting from a turning off of the pump means.

3. The device of claim 2 in combination with an absorbent wick, said wick having a greater water retention capacity than said pad means, said wick being orientated between said pad means and the opening in the tank top so as to receive water from the pad means for subsequent discharge into said tank, said wick enabling the removal of a substantial amount of the moisture from the pad means while maintaining the introduction of water into the tank.

4. The device of claim 3 in combination with a cooling thermostat in circuit with the pump means and the blower means, said thermostat effecting an automatic starting and stopping of both the pump means and blower means responsive to the temperature of the area being cooled by the cooler.

5. The device of claim 1 including a thermostatic spring mounting said switch on said arm, said spring being responsive to a predetermined range of temperature so as to vary the amount of water needed in the tank to effect an opening of the switch.

6. An evaporative cooler comprising vertical cooler pad means, water pump means for delivering water to the upper end of the pad means, blower means for directing a flow of air through the cooler pad means, control means for automatically turning said pump means on and off responsive to the presence of a predetermined amount of water moving through the pad means, said control means including a weight controlled switch, a tank associated with said switch for opening said switch upon an increase in the weight of the tank, and closing said switch upon decreasing the weight of the tank, said tank being located below the cooler pad means and in water receiving communication therewith for receiving the water flowing through the pad means, said water increasing the weight of the tank so as to open the switch, said tank including a limited outlet means for allowing a gradual discharge of water so as to decrease the weight of the tank and open the switch.

References Cited by the Examiner

UNITED STATES PATENTS

| | | |
|---|---|---|
| 2,093,936 | 9/37 | Spielmann. |
| 2,573,158 | 10/51 | Muth et al. _____ 261—66 X |
| 2,587,130 | 2/52 | Feinberg _____ 261—28 |
| 2,634,112 | 4/53 | Snow _____ 261—97 X |
| 2,670,941 | 3/54 | Feinberg _____ 261—97 X |
| 2,678,235 | 5/54 | Perlman _____ 261—99 X |
| 2,685,434 | 8/54 | Underwood _____ 261—29 X |
| 2,939,687 | 6/60 | Goettl _____ 261—26 |

HARRY B. THORNTON, *Primary Examiner*.

HERBERT L. MARTIN, *Examiner*.